United States Patent [19]
Yokoyama et al.

[11] Patent Number: 5,744,690
[45] Date of Patent: Apr. 28, 1998

[54] METHOD OF INCINERATING COMBUSTIBLE WASTES AND CHLORINE SCAVENGER

[75] Inventors: Naruo Yokoyama; Satoru Saito, both of Hiroshima; Suminori Tanaka, Kagawa-ken; Masaharu Nishihara, Marugame; Minoru Ohsugi, Hiroshima, all of Japan

[73] Assignee: Toda Kogyo Corporation, Japan

[21] Appl. No.: 882,352

[22] Filed: Jun. 25, 1997

Related U.S. Application Data

[63] Continuation of Ser. No. 528,213, Sep. 13, 1995, abandoned.

[30]     Foreign Application Priority Data

| Sep. 14, 1994 | [JP] | Japan | 6-219696 |
| Mar. 29, 1995 | [JP] | Japan | 7-097931 |

[51] Int. Cl.⁶ ............................................. B01D 53/68
[52] U.S. Cl. ..................... 588/209; 588/213; 588/248; 106/456; 106/464
[58] Field of Search ................. 588/209, 213, 588/248; 106/456, 464

[56]     References Cited

U.S. PATENT DOCUMENTS

| 4,173,454 | 11/1979 | Heins | 44/15 R |
| 4,191,115 | 3/1980 | Yang et al. | 110/347 |
| 4,210,423 | 7/1980 | Yan | 44/1 C |
| 4,654,203 | 3/1987 | Maurer et al. | 423/240 |
| 4,741,278 | 5/1988 | Franke et al. | 110/342 |
| 5,094,825 | 3/1992 | Mori | 425/240 R |

FOREIGN PATENT DOCUMENTS

| 2165005 | 8/1973 | France . |
| 86 01528 | 3/1986 | WIPO . |

OTHER PUBLICATIONS

Patent Abstracts of Japan, vol. 4, No. 154 (M–038), 28 Oct. 1980 & JP-A-55 105110 (Ebara) 12 Aug. 1980. *Abstract*.

Patent Abstracts of Japan, vol. 7, No. 167 (C–177), 22 Jul. 1958 & JP-A-58 076128 (Kogyo Gijutsuin) 9 May 1983. *Abstract*.

*Primary Examiner*—Arun S. Phasge
*Attorney, Agent, or Firm*—Nixon & Vanderhye

[57]     ABSTRACT

The disclosure describes a method of incinerating combustible wastes comprising the step of incinerating said combustible wastes in the presence of a calcium compound and particles selected from the group consisting of iron oxide particles, ferric oxide hydroxide particles and mixed particles thereof.

22 Claims, 1 Drawing Sheet

AMOUNT OF SPINDLE-SHAPED GOETHITE PARTICLES

FIG.1

AMOUNT OF SPINDLE-SHAPED GOETHITE PARTICLES

METHOD OF INCINERATING COMBUSTIBLE WASTES AND CHLORINE SCAVENGER

This is a rule 62 file wrapper continuation of application Ser. No. 08/528,213, filed Sep. 13, 1995, now abandoned.

BACKGROUND OF THE INVENTION

The present invention relates to a method of incinerating combustible wastes and a chlorine-scavenger. More particularly, the present invention relates to a method of incinerating combustible wastes containing chlorine, and a chlorine-scavenger for effectively scavenging the chlorine contained in combustible wastes and hydrogen chloride caused by chlorine in the initial stage of the combustion, on the surface or at the vicinity of the surface of the combustible wastes in the incinerator, and suppressing the generation of HCl as much as possible at the time of incineration.

The amount of wastes is said to be a parameter of civilization. There has recently been a large amount of combustible wastes such as municipal wastes including living refuse and industrial waste including plastics, and the disposal thereof has become a social problem. In other words, conventional reclamation and incineration are insufficient for the treatment of such wastes.

Especially, the waste plastics discharged amount to as many as several million tons per year. Although a part of the waste plastics are reused as wastes bags and materials of various formed products, a greater remaining part are discarded. In addition, since waste plastics include chlorine-containing materials such as polyvinyl chloride, hydrogen chloride gas is generated during incineration, so that most part of waste plastics are now buried as incombustible wastes separately from general wastes.

In case of burying the waste plastics, there is limited in securing the sites. In contrast, much is expected from a method of incinerating wastes from the point of resource economy because it is possible to reuse combustible wastes as energy resource by incinerating the combustible wastes and generating electricity by utilizing the combustion heat.

However, at the time of incinerating combustible wastes, less than about 10000 ppm of HCl which is derived from chorine contained in the polyvinyl chloride or the like in garbage, diapers and waste plastics is discharged into the exhaust gas. In addition, harmful pollutants such as nitrogen oxides (hereinunder referred to as "NOx"), carbon monoxide (hereinunder referred to as "CO") and dioxins which is said to be so toxic that it is difficult to treat it are generated.

Development of the generation of electricity utilizing the combustion heat at the time of incinerating combustible wastes has been rapid, and the HCl in the exhaust gas generated at the time of incinerating combustible wastes is removed after the exhaust gas is passed through a heat exchanger and before it is discharged into air in order to prevent air contamination.

According to this method, expensive calcium oxide (CaO) or calcium hydroxide ($Ca(OH)_2$) which is obtained by calcinating cheap natural $CaCO_3$ at a high temperature so as to enhance the reactivity with HCl is added at the time of incineration, the contacting area with HCl is increased by using a bag filter or the like disposed at the end of the exhaust gas passage in the incinerating system, and HCl is adsorb-scavenged as calcium chloride ($CaCl_2$). However, when HCl is absorbed at the bag filter portion, at least about three times as large an amount of calcium as the theoretical amount is necessary in order to absorb hydrogen chloride in the exhaust gas. In addition, treatment of the unreacted calcium absorber is a problem.

A heat exchanger which is called a super heater, is used to generate high-temperature steam which is necessary for the generation of electricity, by heat-exchanging the exhaust gas. The HCl generated in the exhaust gas, however, is the cause of the corrosion of the heat exchanger, and it is difficult to generate electricity with high efficiency.

The material of a heat exchanger which is used at present is steel, and if a corrosive ingredient such as HCl is contained in the exhaust gas, the heat resistance of the steel is limited to about 310° C. in steam temperature. It is therefore necessary to incinerate combustible wastes at a low temperature in an incinerator.

In the ordinary generation of electricity which uses heavy oils as the fuel, the electricity-generating efficiency is not less than 30%, while in the case of generating electricity using waste plastics or wastes, the electricity-generating efficiency is at most about 20% even when a high corrosion-resistant steel material is used for the heat exchanger.

In order to enable a highly electricity-generating efficiency, it is strongly demanded to reduce the HCl concentration in the exhaust gas as much as possible and to remove other harmful pollutants with high efficiency, in other words, to suppress the generation of HCl and other harmful pollutants as mush as possible, at an early stage before the exhaust gas comes into contact with the heat exchanger, especially at the time of incineration of combustible wastes.

Various methods have conventionally been essayed so as to remove the HCl generated in the exhaust gas at the time of incinerating combustible wastes. One of them is a method of adding an alkaline earth metal (e.g., Ca and Mg) to wastes before incineration (Japanese Patent Application Laid-Open (KOKAI) No. 163511/1989).

Dioxins is not produced at the time of the burning of combustible wastes but it is produced by the reaction of precursors such as biphenyl ethers and chlorobenzenes, which is generated in a burning step, specifically in an electric dust collector. Consequently, there is no means for suppressing the emission of dioxins into the air except filtering. This is a great problem to be solved.

Although an incineration method which is capable of effectively lowering not only the concentration of HCl but also other harmful pollutants generated in the exhaust gas at the time of incinerating combustible wastes, is strongly demanded in order to enable a highly efficient generation of electricity and wastes incineration free from pollution, such method of adding an alkaline earth metal is not capable of efficiently scavenging chlorine, as will be described in later-described comparative examples, nor suppressing the generation of dioxins.

Accordingly, a method of incinerating combustible wastes and a chlorine-scavenger which are capable of lowering the concentrations of chlorine compounds and other harmful pollutants (e.g., dioxins) in the exhaust gas, which are generated at the time of incineration, as much as possible and which enable a highly electricity-generating efficiency and wastes incineration free from pollution are strongly demanded.

As a result of studies undertaken by the present inventors so as to meet such demand, it has been found that by incinerating combustible wastes in the presence of a calcium compound and iron compound particles, it is possible to greatly lower the concentrations of the chlorine compounds such as HCl, etc. and the other harmful pollutants in the exhaust gas, which are generated at the time of incineration. On the basis of this finding, the present invention has been achieved.

SUMMARY OF THE INVENTION

It is an object of the present invention to provide a method of incinerating combustible wastes which is capable of lowering the concentration of the HCl in the exhaust gas as much as possible and effectively suppressing the generation of dioxins at the time of incineration of combustible wastes.

It is another object of the present invention to provide a chlorine-scavenger which is capable of lowering the concentration of the HCl in the exhaust gas as much as possible and effectively suppressing the generation of dioxins at the time of incineration of combustible wastes.

To achieve these ends, in a first aspect of the present invention, there is provided a method of incinerating combustible wastes comprising the step of incinerating said combustible wastes in the presence of a calcium compound and iron compound particles selected from the group consisting of iron oxide particles, ferric oxide hydroxide particles and mixed particles thereof.

In a second aspect of the present invention, there is provided a method of incinerating combustible wastes comprising the step of incinerating said combustible wastes in the presence of a calcium compound and iron compound particles selected from the group consisting of iron oxide particles, ferric oxide hydroxide particles and mixed particles thereof, the amount of said particles being 2 to 100 parts by weight based on 100 parts by weight of said calcium compound and the amount of said calcium compound being not less than 0.25 mol based on 1 mol of chlorine contained in said combustible wastes.

In a third aspect of the present invention, there is provided a chlorine-scavenger comprising:

100 parts by weight of a calcium compound, and 2 to 100 parts by weight of particles selected from the group consisting of iron oxide particles, ferric oxide hydroxide particles and mixed particles thereof.

In a fourth aspect of the present invention, there is provided a chlorine-scavenger comprising granulated form or pelletized form composed of 100 parts by weight of a calcium compound, 2 to 100 parts by weight of iron compound particles selected from the group consisting of iron oxide particles, ferric oxide hydroxide particles and mixed particles thereof, and an organic binder.

In a fifth aspect of the present invention, there is provided a plastic product comprising:

0.1 to 10.0 wt % of said chlorine-scavenger composed of 100 parts by weight of a calcium compound, and 2 to 100 parts by weight of iron compound particles selected from the group consisting of iron oxide particles, ferric oxide hydroxide particles and mixed particles thereof, and 90 to 99.9 wt % of a thermoplastic resin or a thermosetting resin.

In a six aspect of the present invention, there is provided a shopping bag or a wastes bag comprising:

0.1 to 10.0 wt % of said chlorine-scavenger composed of 100 parts by weight of a calcium compound, and 2 to 100 parts by weight of iron compound particles selected from the group consisting of iron oxide particles, ferric oxide hydroxide particles and mixed particles thereof, and 90 to 99.9 wt % of a thermoplastic resin.

DESCRIPTION OF THE INVENTION

The combustible wastes as an object of treatment in the present invention are general wastes including municipal wastes and industrial wastes containing plastics, and particularly, are combustible wastes containing chlorine such as garbage, diapers, etc., in the general wastes and vinyl chloride resins, (poly) vinylidene chloride resins, etc., in waste plastics. Such combustible wastes containing chlorine produce hydrogen chloride (HCl) at a concentration of less than about 10000 ppm, especially, 800 to 3000 ppm in the exhaust gas when incinerated at not less than 700° C.

The method of the present invention is applicable not only to waste plastics of chlorine-containing polymer materials such as polyvinyl chloride, polyvinylidene chloride, chlorinated polyethylene and chlorinated polypropylene but also to the general wastes which produce hydrogen chloride.

As the calcium compound in the present invention, CaO and $Ca(OH)_2$ which have a high HCl removal activity, $CaCO_3$ which has a low HCl removal activity, and a mixture thereof may be exemplified. From the point of view of economy, $CaCO_3$ is preferable.

The lower limit of the amount of the calcium compound used is 0.25 mol, preferably 0.5mol, more preferably 0.6 mol (calculated as Ca) based on 1 mol of chlorine contained in the combustible wastes, and the upper limit thereof is preferably 1.0 mol based on 1 mol of chlorine contained in the combustible wastes. If the amount of the calcium compound used is less than 0.25 mol based on one mol of chlorine, the chlorine-scavenging percentage may be sometimes lowered. Even if the amount of calcium compound used exceeds 1.0 mol, it is possible to obtain an adequate chlorine- and hydrogen chloride-scavenging percentage, but since the unreacted calcium compound constitutes ash, the amount of ash may increase and it is disadvantageous from the point of view of economy.

As the iron compound particles in the present invention, iron oxide particles, ferric oxide hydroxide particles and a mixed particles thereof may be exemplified.

The amount of the iron compound particles selected from the group consisting of iron oxide particles, the ferric oxide hydroxide particles and a mixture thereof is 2 to 100 parts by weight, preferably 10 to 50 parts by weight, more preferably 15 to 30 parts by weight based on 100 parts by weight of the calcium compound.

When the amount of the iron compound particles is less than 2 parts by weight based on 100 parts by weight of the calcium compound, the chlorine- and hydrogen chloride-scavenging percentage sometimes may be lowered. Even if the iron compound particles exceed 100 parts by weight, it is possible to obtain an adequate chlorine- and hydrogen chloride-scavenging percentage, but the amount of ash after incineration increases and it is also disadvantageous from the point of view of economy.

The iron compound particles used in the present invention are preferably iron oxide particles such as hematite ($\alpha$-$Fe_2O_3$) particles, magnetite ($FeOx.Fe_2O_3$, $0<x\leq1$) particles and maghemite ($\gamma$-$Fe_2O_3$) particles. These particles may have a shape selected from the group consisting of granular shape such as spherical, octahedral and hexahedral shapes, a spindle shape and an acicular shape.

The average particle size of the iron oxide particles is preferably 0.01 to 1.0 µm, more preferably 0.05 to 0.3 µm in the case of granular particles, the average major axial diameter is 0.1 to 0.5 µm, more preferably 0.1 to 0.3 µm in the case of spindle-shaped particles, and the average major axial diameter is 0.1 to 0.5 μm, more preferably 0.1 to 0.3 μm in the case of acicular particles.

The iron compound particles used in the present invention are preferably ferric oxide hydroxide particles such as goethite (α-FeOOH), akaganeite (β-FeOOH), lepidocrocite (γFeOOH). The goethite particles have an acicular or spindle shape, the akaganeite particles an acicular shape and lepidocrocite particles an acicular or lamellar shape.

Under the consideration of the chlorine- and hydrogen chloride-scavenging percentage at the time of incinerating combustible wastes, spindle-shaped goethite particles are more preferable. This is because the catalytic activity thereof is high due to the form of one spindle-shaped goethite particle which is a bundle of a multiplicity of fine particles.

As to the particle size of the ferric oxide hydroxide particles, the average major axial diameter is preferably 0.08 to 0.5 μm, more preferably 0.1 to 0.3 μm.

The iron oxide particles and/or ferric oxide hydroxide particles and the calcium compound may be added to combustible wastes in the form of a powder. The iron oxide particles and/or ferric oxide hydroxide particles may also be supplied in the form of a slurry. For example, it is possible to disperse spindle-shaped goethite obtained by adding ferrous salt solution and sodium carbonate solution, blowing air into the resultant alkaline suspension containing iron carbonate to oxidize iron carbonate, thereby obtaining spindle-shaped goethite, and filtrating and if necessary, washing with the water, without drying, into water and to use it in the form of a slurry.

In order to enhance an the chlorine- or hydrogen chloride-scavenging efficiency (reacting efficiency to chlorine or hydrogen chloride on the surface or in the vicinity of the surface of the combustible wastes), it is important to make the contacting area of the calcium compound and iron compound particles large, and in other words, the distribution of the calcium compound and iron compound particles is well-proportioned. For this purpose, it is preferable to mix the calcium compound with the iron oxide particles and/or the ferric oxide hydroxide particles.

It is possible to directly spray the mixture in the form of a powder onto combustible wastes. If the mixture is sprayed in the form of an aqueous suspension or an oil suspension to combustible wastes or the mixture is granulated or pelletized together with an organic binder before being added to combustible wastes, the contacting area of the mixture of the calcium compound and the iron oxide particles and/or ferric oxide hydroxide particles to the combustible wastes is increased, thereby enhancing the chlorine-scavenging efficiency.

In the case of using the mixture in the form of a suspension, it is preferable to produce a suspension from the mixture of the calcium compound and the iron oxide particles and/or ferric oxide hydroxide particles as it is. If necessary, a suspension of the calcium compound singly and a suspension of the iron oxide particles and/or ferric oxide hydroxide particles singly may be produced, and both suspension may be sprayed to mix the both on the combustible wastes. It is also possible to spray either of the calcium compound and the iron oxide particles and/or ferric oxide hydroxide particles in the form of a powder and to spray the other in the form of a suspension and mix the both on the combustible wastes.

The aqueous suspension is produced by suspending the mixture of the calcium compound and the iron oxide particles and/or ferric oxide hydroxide particles in water or a mixed solution of water and water-soluble organic solvent such as alcohol by using a dispersant, if necessary.

The oil suspension is produced by suspending the mixture of the calcium compound and the iron oxide particles and/or ferric oxide hydroxide particles in a fuel oil or a waste oil (obtained from a mineral oil or natural fats and oils) by using a dispersant, if necessary.

The concentration of the mixture of the calcium compound and the iron oxide particles and/or ferric oxide hydroxide particles in the aqueous suspension or the oil suspension is determined with the consideration of the factors such as the feeding speed in a pipe, the spraying property and the combustibility, but the concentration of the mixture of the calcium compound and the iron oxide particles and/or ferric oxide hydroxide particles, wherein the amount of the iron oxide particles and/or ferric oxide hydroxide particles is 2 to 100 parts by weight, preferably 10 to 50 parts by weight, more preferably 15 to 30 parts by weight based on 100 parts by weight of the calcium compound, is preferably 5 to 80 wt %, more preferably 8 to 50 wt %.

The chlorine-scavenger according to the present invention is composed of a composition composed of a calcium compound and iron compound particles selected from the group consisting of iron oxide particle, ferric oxide hydroxide particles and a mixed particles thereof, and the composition may be granulated or pelletized together with an organic binder.

As the organic binder, any binder is usable including one which generates a reducing gas at the time of incineration. Examples of the organic binder are thermoplastic resins, thermosetting resins, natural high molecular substances, fats and oils, wax, tar and pitch. Also, as the organic binder, waste plastics may be used.

Examples of the thermoplastic resin used as the organic binder in the present invention are polyethylene, polypropylene, polystyrene, polyvinyl acetate, poly-4-methylpentene-1, ionomers, ethylene-vinyl acetate copolymers, ABS resins, polyvinyl alcohols, polycarbonates, polyamides, polyesters and cellulose esters. Examples of the thermosetting resin are phenol resins, epoxy resins, polyurethane, unsaturated polyester, urea resins, melamine resins and silicone resins.

The amount of the organic binder is preferably 25 to 1900 parts by weight, more preferably 30 to 400 based on 100 parts by weight of the mixture of the calcium compound and iron oxide particles and/or ferric oxide hydroxide particles, wherein the amount of the iron oxide particles and/or ferric oxide hydroxide particles is 2 to 100 parts by weight, preferably 10 to 50 parts by weight, more preferably 15 to 30 parts by weight based on 100 parts by weight of the calcium compound.

As the form of the chlorine scavenger according to the present invention, a master batch such as granules, pellets, etc., which are composed of the calcium compound, iron compound particles such as iron oxide particles and/or ferric oxide hydroxide particles, and thermoplastic resins or thermosetting resins, may be cited. Also, plastic formed products obtained by molding the master batch, may be cited. The plastic formed products are products formed according to specific uses and purposes, by an extruding molding, an injection molding, a blow molding, a compression molding, a calendering molding and a casting molding.

For example, a film (thickness: less than 0.2 mm), a sheet (thickness: not less than 0.2 mm) and a band, which are formed by the extruding molding, and a product formed according to specific uses and purposes may be cited. As the film, a general film such as a film for agriculture, a packaging film for industries, a food-packaging film, etc., a processed product thereof such as a shopping bag, a refuse bags, sorting bag and a packaging bag, a film for packaging heavy-weight articles, and a processed product thereof such as a bag for rice, fertilizer, etc., a cement bag, etc. may be exemplified. Also, a thermoforming film such as a film for packaging foodstuffs, industrial products, etc. may be cited.

As the sheet, a thermoforming sheet, a processed product thereof such as trays and caps formed by a vacuum forming and a pressure forming, etc., may be cited. As the band, a binding band, etc. may be cited.

A foaming product and a cushion material produced by a foaming and an extruding molding, containers of all kinds produced by the injection molding, and a bottle produced by a blow molding may be cited.

Since a chlorine scavenger is contained in these plastic formed products, if they are incinerated after use, together with waste plastics, it is possible to scavenge chloride during the incineration without adding the above-described chlorine-scavenger. As the thermoplastic resins or thermosetting resins used herein, the above-mentioned resins are usable.

As an example of the plastic formed products which contain a chlorine-scavenger of the present invention, a plastic wastes bag or shopping bag will be explained.

A bag such as a plastic wastes bag or shopping bag is composed of a thermoplastic resin film containing 0.1 to 10 wt % of a mixture of a calcium compound and iron oxide particles and/or ferric oxide hydroxide particles, wherein the amount of the iron oxide particles and/or ferric oxide hydroxide particles is 2 to 100 parts by weight, preferably 100 to 50 parts by weight, more preferably 15 to 30 parts by weight based on 100 parts by weight of the calcium compound.

As the thermoplastic resin used for the bag, any thermoplastic resin that is suitable for ordinary extrusion molding is usable without limitation, but polyethylene resins such as low-density polyethylene, linear low-density polyethylene, high-density polyethylene, and a copolymer of ethylene and another polymeric monomer such as (meth)acrylate and vinyl acetate are preferably used because they are cheaply available in large quantities. Above all, high-density polyethylene and linear low-density polyethylene are especially preferably used because they can produce a film having a high mechanical strength even if the film is comparatively thin.

If the content of the mixture is less than 0.1 wt %, the effect of the clean incineration may be insufficient. On the other hand, if the content of the mixture exceeds 10.0 wt %, since the strength of the film is greatly lowered, it is unsuitable for a shopping bag. In order to enhance the clean incineration efficiency of combustible wastes as a whole in the incinerator while maintaining the mechanical strength of, the film, the content of the mixture is preferably 0.1 to 5.0 wt %, more preferably 0.5 to 3.0 wt %.

When the content of the mixture is small, the plastic product obtained becomes transparent or translucent, and when the content is large, the product becomes opaque. The content may be appropriately selected from the above-described range in accordance with the use of the plastic product.

A shopping bag or wastes bag of the present invention is generally produced by mixing the calcium compound and iron oxide particles and/or ferric oxide hydroxide particles with the above-described thermoplastic resin such as polyethylene resins, supplying the resultant mixture to an ordinary extruder or the like, melting and kneading the resultant mixture, film-forming by inflation, T-die extrusion or the like to obtain a film having a thickness of about 10 to about 70 μm, and heat-sealing the obtained film into a predetermined shape to obtain a bag.

A known additive such as lubricant, anti-blocking agent, anti-oxidizing agent, weathering agent and coloring agent, or an organic or inorganic filler, as occasion demands, may be contained in a thermoplastic resin film used for a shopping or wastes bag of the present invention.

The scavenging of chlorine and hydrogen chloride according to the present invention is carried out by incinerating combustible wastes in the presence of a calcium compound and iron oxide particles and/or ferric oxide hydroxide particles.

The incineration temperature in the present invention is not lower than 700° C., preferably not lower than 850° C., more preferably not lower than 1000° C., still more preferably not lower than 1100° C. If the temperature is lower than 700° C., a highly efficient generation of electricity and a clean incineration are difficult.

Figure 1:
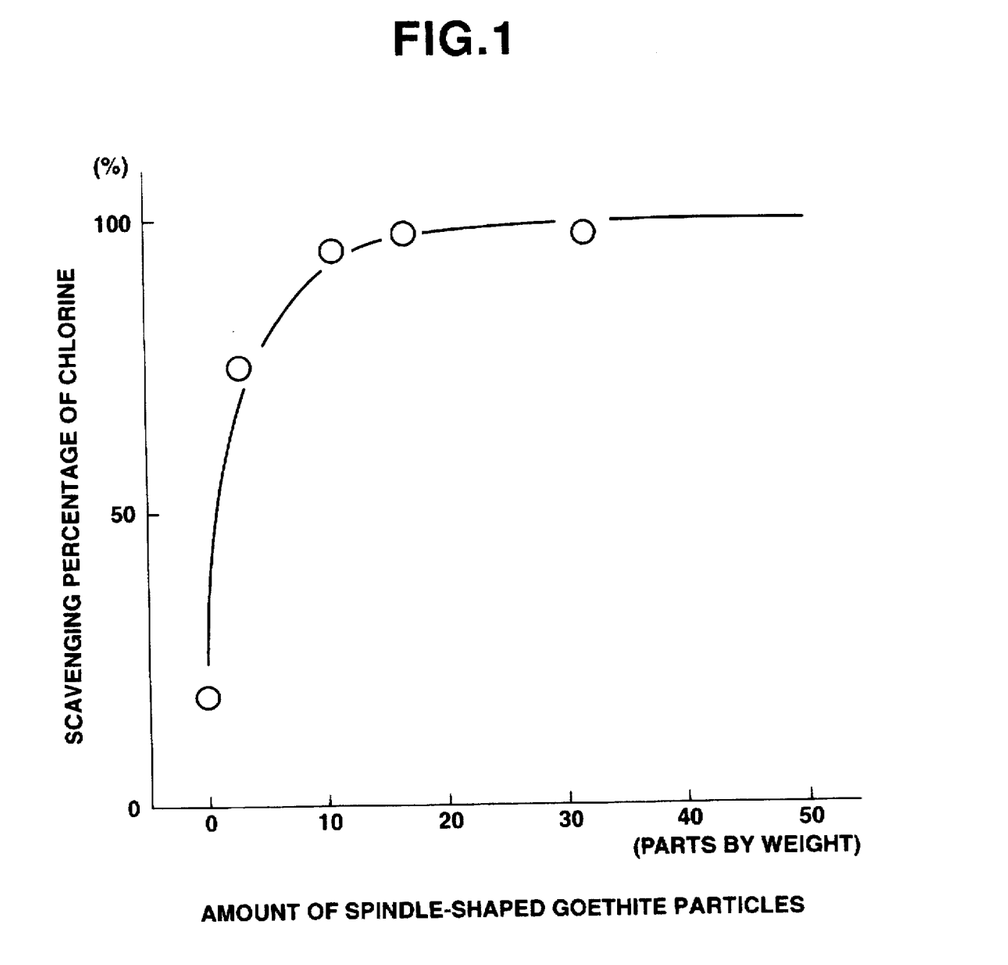
FIG. 1 shows a scavenging percentage of chlorine when spindle-shaped goethite particles are added to $CaCO_3$.

As seen from Examples, Comparative Examples and the drawing described later, the chlorine- and hydrogen chloride-scavenging percentage in the method using as a chlorine-scavenger the mixed particles composed of the calcium compound and the iron compound of iron oxide and/or ferric oxide hydroxide particles according to the present invention is superior as comparison with the method using the calcium compound alone.

In case of using the constant amount of the calcium compound, the more the amount of the iron compound particles which coexist with the calcium compound increases, the more the chlorine- and hydrogen chloride-scavenging percentage increases.

Under the consideration of the chlorine- and hydrogen chloride-scavenging percentage, an industrial efficiency, an economical efficiency, a purpose of using, use, etc., it is possible to select the amount of the chlorine-scavenger, the blending ratio of the iron compound particles to the calcium compound.

The chlorine- and hydrogen chloride-scavenging percentage according to the incineration method of the present invention is preferably not less than 75%, more preferably not less than 95%, still more preferably not less than 98%.

In case where the amount of the calcium compound used is not less than 0.4 mol, preferably 0.4 to 1 mol based on one mol of chlorine contained in combustible wastes and the amount of iron compound particles composed of iron oxide particles and/or ferric oxide hydroxide particles which are blended with the calcium compound, is 3 to 50 parts by weight based on 100 parts by weight of the calcium compound, it is possible to achieve not less than 75% of the chlorine- and hydrogen chloride-scavenging percentage.

In case where the amount of the calcium compound used is not less than 0.6 mol, preferably 0.6 to 1 mol based on one mol of chlorine contained in combustible wastes and the amount of iron compound particles composed of iron oxide particles and/or ferric oxide hydroxide particles which are blended with the calcium compound, is 10 to 50 parts by weight based on 100 parts by weight of the calcium compound, it is possible to achieve not less than 95% of the chlorine- and hydrogen chloride-scavenging percentage.

In case where the amount of the calcium compound used is not less than 0.8 mol, preferably 0.8 to 1 mol based on one mol of chlorine contained in combustible wastes and the amount of iron compound particles composed of iron oxide particles and/or ferric oxide hydroxide particles which are blended with the calcium compound, is 11 to 50 parts by weight based on 100 parts by weight of the calcium compound, it is possible to achieve not less than 98% of the chlorine- and hydrogen chloride-scavenging percentage.

It is also possible to suppress the generation of dioxins to not more than 0.5 TEQng/Nm³, preferable not less than 0.1 TEQng/Nm³.

The incineration method of the present invention also enables the CO content in the exhaust gas to be reduced to not more than 50 ppm, preferably not more than 25 ppm.

What is the most important in the present invention is the fact that when the combustible wastes is incinerated at a temperature of not lower than 700° C. in the presence of a calcium compound and iron oxide particles and/or ferric oxide hydroxide particles, it is possible to effectively scavenge chlorine in the combustible wastes, thereby lowering markedly the concentration of HCl in the exhaust gas.

The present inventors consider the reason why it is possible to effectively scavenge chlorine in the combustible wastes by the method of present invention, is that the iron oxide particles and/or ferric oxide hydroxide particles coexisting with a calcium compound are capable of converting chlorine contained in the combustible wastes to activated hydrogen chloride (HCl*) and scavenging chlorine as activated hydrogen chloride (HCl*) on the surface or in the vicinity of the surface of the combustible wastes, so that the reaction of chlorine or hydrogen with the calcium compound easily progresses.

This will be explained in detail in the following.

When the atmosphere in the vicinity of the interface between the chlorine-scavenger composed of the calcium compound and iron oxide particles and/or ferric oxide hydroxide particles, and the combustible wastes such as organic substances incinerated in the decomposition and combustion at the relatively low temperature under the condition of insufficient supply of oxygen at the point of time of temperature-up and light-up, is seen microscopically, it assumes a reducing state due to the reaction of the ambient organic substance, as represented by the following formula:

Organic substance+H₂O→generation of H₂, CO, etc.

The iron oxide particles as it is and which are produced by dehydrating ferric oxide hydroxide particles are reduced and become FeO to FeOx (0<x≦1). The produced FeOx (0<x ≦1) has a high reactivity and quickly reacts with Cl which is contained in the combustible wastes such as (poly) vinyl chloride resin or the like, and iron chloride (FeCl₂) is temporarily generated, as represented by the following formula:

FeO+2HCl→FeCl2+H₂O

The produced FeCl₂ reacts with H₂O in the vicinity of the reaction boundary of high-temperature incineration in which oxygen is adequately supplied, and it is decomposed, so that 2HCl* is generated as represented by the following formula:

FeCl₂+H₂O→FeO+2HCl*

The produced HCl* has a high reactivity and very quickly reacts with CaCO₃ which coexists with the iron oxide particles, without separating therefrom, as represented by the following formula:

CaCO₃ +2HCl*→CaCl₂+H₂O+CO₂

Further, it is considered that the generation of dioxins is suppressed in the present invention because complete incineration of the burnt portion is accelerated by the incineration-accelerating operation of the iron oxide particles and/or ferric oxide hydroxide particles, so that the generation of a dioxins precursor such as biphenyl ethers and chlorobenzenes is suppressed.

Furthermore, in the present invention, a heavy metal component is not detected in a test of dissolving the residue ash, which is obtained when combustible wastes containing the heavy metal component is incinerated, in water. This is considered to be because the heavy metal component is fixed in ferrite in the state of being insoluble in water by the ferrite-forming reaction of the heavy metal component and the iron oxide particles.

FIG. 1 shows the chlorine-scavenging percentage when the amount of spindle-shaped goethite particles added was varied in the system in which 2.5 parts by weight of CaCO₃ was added based on 100 parts by weight of simulated wastes which contained 8 parts by weight of polyvinyl chloride (Cl content: 50 wt %).

As shown in FIG. 1, when the calcium compound and the iron oxide particles and/or ferric oxide hydroxide particles are used together, it is possible to effectively scavenge chlorine contained on the combustible wastes, thereby lowering markedly the HCl concentration in the exhaust gas as compared with the single use of the calcium compound.

As the amount of iron oxide particles and/or ferric oxide hydroxide particles coexisting with the calcium compound becomes large, the efficiency of scavenging chlorine contained on the combustible wastes.

According to a method of incinerating combustible wastes of the present invention, it is possible to effectively lower the HCl concentration in the exhaust gas and efficiently remove other harmful pollutants.

Further, it is therefore possible to expect a highly efficient generation of electricity by the method of incinerating combustible wastes according to the present invention.

The present invention is advantageous in that it is possible not only to effectively use calcium carbonate which is considered to have a low activity as a chlorine or hydrogen chloride scavenger but to reduce the amount of calcium compound used because the chlorine-scavenger of the present invention has a higher chlorine- and hydrogen chloride-scavenging efficiency than slaked lime or quick lime.

In addition, according to the method of the present invention, all that is necessary is charging a chlorine-scavenger into an incinerator, and since a device for contacting slaked lime and hydrogen chloride is dispensed with and the necessary capacity of a dust collector is smaller than in a conventional method, the equipment cost is reduced. Since chlorine contained in the combustible wastes is scavenged in the incinerator, it is possible to alleviate problems of the corrosion of a heat exchanger by hydrogen chloride in the related art.

In this way, according to the present invention, it is possible not only to incinerate chlorine-containing polymer materials which are conventionally difficult to incinerate, but also to expect a highly efficient generation of electricity utilizing waste plastics. In addition, since a chlorine-scavenger according to the present invention is composed of the calcium compound and iron oxide particles and/or ferric oxide hydroxide particles, it is possible to expect an improvement of the combustion efficiency and a reduction of the amount of NOx generated due to the incineration-accelerating catalytic function of the iron oxide particles and/or ferric oxide hydroxide particles.

EXAMPLES

The present invention will now be described in more detail with reference to the following examples, but the present invention is not restricted to those examples and various modifications are possible within the scope of the invention.

The amount of chlorine which had reacted with calcium was obtained by washing the residue of incineration with distilled water, filtering the solution, and titrating the filtrate in 0.1 N aqueous silver nitrate solution by potentiometric titration using an automatic titrimeter (COMTITE-101, produced by Hiranuma Seisakusho Co., Ltd.).

The HCl in the exhaust gas was analyzed by sucking the exhaust gas into a washing bottle containing water via a gas flowmeter, and analyzing the HCl in the aqueous solution in the washing bottle by chromatography.

The chlorine scavenging ratio is expressed by the percentage of the amount of chlorine in the residue of incineration to the amount of chlorine in the exhaust gas in case of incinerating without using the chlorine- or hydrogen chloride-scavenger.

The amount of CO in the exhaust gas was determined by passing the exhaust gas into a non-dispersive infrared spectrometer APMA-3500 (manufactured by Horiba Seisakusho Co., Ltd.).

The NOx content in the exhaust gas was determined by passing the exhaust gas into a chemiluminescent NOx meter NOA-305A (manufactured by Horiba Seisakusho Co., Ltd.).

The analysis of the dioxins in the exhaust gas is expressed by the value measured by a method approved by The Waste Research Foundation ("Analysis Manual for Measuring Dioxins in Refuse Disposal", pages 1 to 22, published on Jan. 1991).

The heavy metal content in the residual ash after incineration was determined by "Determining Method of Heavy Metal contained in the industrial wastes", No. 13, published by Environment Agency in Japan.

The specimen was inserted into a combustion boat made of high alumina, heated to 900° C. at a temperature rising rate of 300° C./hour by using a electric heater, and keeping the temperature of 900° C. for 60 minutes to incinerate the specimen, thereby obtaining the residual ash. The heavy metal content in the obtained residual ash after incineration was determined by immersing 100 g of the ash obtained after test incineration in 100 ml of distilled water, centrifuging the suspension after 24 hours, and determining the heavy metal in the elute.

The hydrogen chloride absorption efficiency (A(%)) was obtained in accordance with the following formula:

$$A (\%) = F \times 100 / T$$

wherein F represents the actual amount (g) of absorption of hydrogen chloride and T represents the theoretical amount (g) of hydrogen chloride which the calcium carbonate used can absorbed.

EXAMPLE 1

Since the composition of the actual municipal wastes varies, the measurement of the trace pollutants is impossible. In Example 1, municipal wastes was simulated by adding various pollutants which cause harmful waste, to sawdust from a sawmill. 3 parts by weight of polyvinyl chloride (Cl content: 50%) powder as an pollutant causing hydrochloric acid and dioxins, 1 part by weight of lead oxide powder, 1 part by weight of zinc oxide powder and 2 parts by weight of copper oxide powder as typical heavy metals were added to 93 parts by weight of sawdust, and 100 parts by weight of simulated wastes in total was prepared. 2.5 parts by weight of $CaCO_3$ (equivalent to 0.6 mol based on one mol of Cl) was added to 100 parts by weight of the simulated wastes, and spindle-shaped goethite particles (BET specific surface area: 80 m²/g, average major axial diameter: 0.3 μm) at the weight ratio of 3 parts by weight based on 100 parts by weight of $CaCO_3$ were further added.

The incinerator was heated to 1000° C., and the simulated wastes was supplied into the incinerator at a rate of 3 kg/hour while flowing air at a rate of 48 m³/hour.

The scavenging percentage of chlorine contained in the simulated wastes was 75%.

EXAMPLE 2 to 4

Simulated wastes was produced and incinerated in the same procedures as in Example 1 except for changing the amount of spindle-shaped goethite particles added (BET specific surface area: 80 m²/g, average major axial diameter: 0.3 μm) to 11 parts by weight, 17 parts by weight and 32 parts by weight, respectively, based on 100 parts by weight of $CaCO_3$. The scavenging percentage of chlorine contained in the simulated wastes was 95%, 98% (HCl remaining in the exhaust gas was 16 ppm) and 98% (HCl remaining in the exhaust gas was 10 ppm), respectively.

EXAMPLE 5

Simulated wastes was produced and incinerated in the same procedures as in Example 1 except for changing the amount of $CaCO_3$ added to 3.3 parts by weight (equivalent to 0.8 mol based on one mol of Cl) based on 100 parts by weight of the simulated wastes. The scavenging percentage of chlorine contained in the simulated wastes was 95%.

EXAMPLE 6

Simulated wastes was produced and incinerated in the same procedures as in Example 5 except for changing the amount of spindle-shaped goethite particles added (BET specific surface area: 80 m²/g, average major axial diameter: 0.3 μm) to 11 parts by weight based on 100 parts by weight of $CaCO_3$. The scavenging percentage of chlorine contained in the simulated wastes was 98% (HCl remaining in the exhaust gas was 10 ppm).

EXAMPLES 7 to 13

Simulated wastes was produced and incinerated in the same procedures as in Example 1 except for changing the amount of iron oxide particles and/or ferric oxide hydroxide particles added to 10 parts by weight based on 100 parts by weight of $CaCO_3$, and varying the kind as shown in Table 1. The scavenging percentage of chlorine contained in the simulated wastes was 95% (HCl remaining in the exhaust gas was 40 ppm), 98% (HCl remaining in the exhaust gas was 18 ppm), 94%, 93%, 90%, 85% and 92%, respectively.

EXAMPLES 14 to 16

Simulated wastes was produced and incinerated in the same procedures as in Example 1 except that 2.5 parts by weight (equivalent to 0.6 mol based on one mol of 1) of $CaCO_3$ was added to 100 parts by weight of the simulated wastes, that 3 parts by weight of spindle-shaped goethite particles (BET specific surface area: 80 m²/g, average major axial diameter: 0.3 μm) based on 100 parts by weight of $CaCO_3$ were further added, and that the incineration temperature was changed to 850° C., 1000° C. and 1100° C., respectively. The scavenging percentage of chlorine contained in the simulated wastes was 68%, 75% and 90%, respectively.

The NOx content and the CO content in the exhaust gas are shown in Table 2. The NOx content and the CO content in the exhaust gas when no spindle-shaped goethite particles were added are also shown for reference.

The residue ash obtained in Example 16 was dissolved in water, and as a result of the determination of the heavy metal, neither Pb nor Zn was detected. In a reference test in which no spindle-shaped goethite particles were added, the Pb content and Zn content were 0.25 ppm and 0.03 ppm, respectively. Cu was not detected in either case.

The dioxins content in the exhaust gas generated in Example 16 was 0.3 $TEQng/Nm^3$. In a reference test in which no spindle-shaped goethite particles were added, the dioxins content was 31.0 $TEQng/Nm^3$.

EXAMPLE 17

Simulated wastes was produced in the same procedures as in Example 16.

The spindle-shaped goethite particles (BET specific surface area: 80 $m^2/g$, average major axial diameter: 0.3 μm) obtained by a wet-process was filtered out, washed with water and directly dispersed again into water without drying, thereby producing an aqueous suspension containing 10 wt % of spindle-shaped goethite particles.

The simulated wastes was incinerated in the same procedures as in Example 16 except that 3 parts by weight of the aqueous suspension (calculated as spindle-shaped goethite particles) based on 100 parts by weight of calcium carbonate was sprayed into the incinerator.

The scavenging percentage of chlorine contained in the simulated wastes was 95%, and the dioxins content in the exhaust gas generated was 0.1 $TEQng/Nm^3$.

It is considered that since the spindle-shaped goethite particles produced by a wet-process and used in the form of an aqueous suspension without drying exist not in the form of a powder of agglomerated particles but in the form of discrete particles, the surface area which shows catalytic activity increases, which leads to an improvement of the catalytic effect.

EXAMPLE 18

Simulated wastes was produced in the same procedures as in Example 16.

2.2 parts by weight of titanium coupling agent PLENACT KR-TTS (trade name, produced by Ajinomoto Co., Inc.) was added to a mixed powder of 100 parts by weight of calcium carbonate and 10 parts by weight of spindle-shaped goethite particles (BET specific surface area: 80 $m^2/g$ average major axial diameter: 0.3 μm).

The simulated wastes was incinerated in the same procedures as in Example 16 except that 2.5 parts by weight of the oil suspension calculated as calcium carbonate based on 100 parts by weight of the simulated wastes was sprayed into the incinerator.

The scavenging percentage of chlorine contained in the simulated wastes was 97%, and the dioxins content in the exhaust gas generated was 0.3 $TEQng/Nm^3$.

COMPARATIVE EXAMPLE 1

Simulated wastes was produced and incinerated in the same procedures as in Example 1 except for adding neither $CaCO_3$ nor spindle-shaped goethite particles to the simulated wastes. The amount of HCl generated in the exhaust gas was 800 ppm and all of the HCl was discharged into the gas.

COMPARATIVE EXAMPLE 2

Simulated wastes was produced and incinerated in the same procedures as in Example 1 except for adding no $CaCO_3$ to the simulated wastes. The amount of HCl generated in the exhaust gas was 800 ppm, and all of the HCl was discharged into the gas.

COMPARATIVE EXAMPLE 3

Simulated wastes was produced and incinerated in the same procedures as in Example 1 except for adding no spindle-shaped goethite particles to the simulated wastes. The amount of HCl generated in the exhaust gas was 648 ppm, and scavenging percentage of chlorine contained in the simulated wastes was 19%.

COMPARATIVE EXAMPLE 4

Simulated wastes was produced and incinerated in the same procedures as in Example 3 except for changing the amount of $CaCO_3$ added to 10.6 parts by weight (equivalent to 2.5 mol based on one mol of Cl) based on 100 parts by weight of the simulated wastes. The scavenging percentage of chlorine contained in the simulated wastes was 25%.

EXAMPLE 19

Simulated wastes was produced and incinerated in the same procedures as in Example 1 except for changing the incineration temperature to 750° C. The scavenging percentage of chlorine contained in the simulated wastes was 60%.

TABLE 1

| | Iron oxide or ferric oxide hydroxide | | |
|---|---|---|---|
| | Kind | BET specific surface area | Average particle diameter |
| Ex. 7 | Spindle-shaped goethite particles | 80 | Average major axial diameter 0.3 |
| Ex. 8 | Spindle-shaped goethite particles | 145 | Average major axial diameter 0.21 |
| Ex. 9 | Acicular goethite particles | 100 | Average major axial diameter 0.15 |
| Ex. 10 | Spindle-shaped hematite particles | 45 | Average major axial diameter 0.23 |
| Ex. 11 | Spindle-shaped maghemite particles | 40 | Average major axial diameter 0.21 |
| Ex. 12 | Granular magnetite particles | 5.4 | Average particle diameter 0.28 |
| Ex. 13 | Granular magnetite particles | 21 | Average particle diameter 0.06 |

TABLE 2

|  | NOx content (ppm) | | CO content (ppm) | |
| --- | --- | --- | --- | --- |
|  | CaCO₃ singly | CaCO₃ and goethite particles | CaCO₃ singly | CaCO₃ and goethite particles |
| Ex. 14 | 90 | 40 | 150 | 20 |
| Ex. 15 | 100 | 40 | 140 | 20 |
| Ex. 16 | 110 | 50 | 125 | 10 |

EXAMPLES 20 to 22, COMPARATIVE EXAMPLE 5

A sample mixed with 70 parts by weight of a commercially available polyvinyl chloride powder (produced by Wako Pure Chemical Industries, Ltd., n=1,100) and 30 parts by weight of a chlorine-scavenger produced by mixing calcium carbonate (produced by Wako Pure Chemical Industries, Ltd., special grade chemical) and ferric oxide hydroxide particles (produced by Toda Kogyo Corporation) in the ratio shown in Table 3, was incinerated under the following conditions. The smoke generated during incineration was observed, the amount of residual ash was measured, the color of the ash was observed, the chlorine content in the ash was measured, and the hydrogen chlorine absorption efficiency of calcium carbonate was obtained and the chlorine-scavenging percentage was calculated. The results are shown in Table 3.

Incineration conditions 2.000 g of a sample was weighed and charged into a 50-ml porcelain crucible (depth: 4.0 cm). The incineration process in an incinerator was simulated. That is, after the sample was lidded and heated at about 550° C. for 5 minutes, the lid was removed, and the sample was ignited and heated at the same temperature for about 1 minute. Thereafter, the sample was further incinerated at 740° C. for 10 minutes.

EXAMPLE 23

A sample mixed with 63 parts by weight of a commercially available polyvinyl chloride powder (same as that in Example 1) and 37 parts by weight of the following granulated composition was incinerated in the same procedures as in Example 20. The chlorine content in the ash was measured, the hydrogen chlorine absorption efficiency of calcium carbonate was obtained, and the chlorine- and hydrogen chloride-scavenging percentage was calculated. The results are shown in Table 3.

Mixing ratio of composition

| Calcium carbonate (same as that in Example 20) | 64.86 parts by weight |
| --- | --- |
| Ferric oxide hydroxide particles (same as that in Example 20) | 8.11 parts by weight |
| Paraffin wax (produced by Wako Pure Chemical Industries, Ltd., | 27.03 parts by weight |

TABLE 3

| | Composition (parts by weight) | | | |
| --- | --- | --- | --- | --- |
| | Polyvinyl chloride | Calcium carbonate (CaCO₃) | ferric oxide hydroxide particles | Paraffin wax |
| Ex. 20 | 70 | 29 | 1 | — |
| Ex. 21 | 70 | 25 | 5 | — |
| Ex. 22 | 70 | 20 | 10 | — |
| Ex. 23 | 63 | 24 | 3 | 10 |
| Comp. Ex. 5 | 70 | 30 | — | — |

| | Composition ratio | | |
| --- | --- | --- | --- |
| | Ca/Cl (molar ratio) | CaCO₃/FeOOH (parts by weight ratio) | Absorption efficiency of CaCO₃ (%) |
| Ex. 20 | 0.26 | 100/3.4 | 46.24 |
| Ex. 21 | 0.22 | 100/20.0 | 79.16 |
| Ex. 22 | 0.18 | 100/50.0 | 85.02 |
| Ex. 23 | 0.24 | 100/12.5 | 65.14 |
| Comp. Ex. 5 | 0.27 | 100/0 | 18.03 |

| | | In case of calculation to Ca/Cl = 0.25 (molar ratio) | |
| --- | --- | --- | --- |
| | Chlorine-scavenging percentage (%) | Chlorine-scavenging percentage (%) | Ratio of chlorine-scavenging percentage |
| Ex. 20 | 24.0 | 23.0 | 2.6 |
| Ex. 21 | 34.8 | 39.5 | 4.4 |
| Ex. 22 | 30.6 | 42.5 | 4.7 |
| Ex. 23 | 31.2 | 32.5 | 3.6 |
| Comp. Ex. 5 | 9.7 | 9.0 | 1.0 |

It is clear from Table 3 that the chlorine-scavenger of the present invention in any of Examples 20 to 23 exhibits an excellent chlorine-scavenging operation in the incinerator as compared with Comparative Example 5 which was used only calcium carbonate.

For reference, the hydrogen chloride absorption efficiency of calcium carbonate and the chlorine- and hydrogen chloride-scavenging percentage are shown in Table 3 in case of calculating Ca/Cl molar ratio to 0.25 in Examples 20 to 23 and Comparative Example 5.

What is claimed is:

1. A method of incinerating chlorine-containing combustible waste comprising the step of incinerating said combustible wastes at a temperature of not lower than 700° C. in the presence of a calcium compound and particles selected from the group consisting of (a) iron oxide particles selected from the group consisting of hematite particles, magnetite particles, maghemite particles and mixed particles thereof, (b) ferric oxide hydroxide particles selected from the group consisting of goethite particles, akaganeite particles, lepidocrocite particles and mixed particles thereof, and (c) mixtures of (a) and (b), wherein the amount of said particles is 2 to 100 parts by weight based on 100 parts by weight of said calcium compound, the amount of said calcium compound is 0.25 to 1.0 mol based on 1 mol of chlorine contained in said combustible waste, the average particle size of the iron oxide particles is 0.01 to 1.0 μm in the case of granular particles, the average major axial diameter of the iron oxide particles is 0.1 to 0.5 μm in the case of spindle-shaped particles, the average major axial diameter of the iron oxide particles is 0.1 to 0.5 μm in the case of acicular particles, and the average major axial diameter of the ferric oxide hydroxide particles is 0.08 to 0.5 μm.

2. A method of incinerating chlorine-containing combustible waste according to claim 1, wherein said particles are (b) ferric oxide hydroxide particles.

3. A method of incinerating chlorine-containing combustible waste according to claim 1, wherein said calcium compound is selected from the group consisting of calcium oxide, calcium hydroxide, calcium carbonate and mixtures thereof.

4. A method of incinerating chlorine-containing combustible waste according to claim 1, wherein said combustible waste is incinerated at a temperature of not lower than 850° C.

5. A method of incinerating chlorine-containing combustible waste according to claim 1 wherein the amount of said particles is 3 to 50 parts by weight based on 100 parts by weight of said calcium compound and the amount of said calcium compound is 0.4 to 1 mol based on 1 mol of chlorine contained in said combustible wastes.

6. A method of incinerating chlorine-containing combustible waste according to claim 1, wherein the amount of said particles is 10 to 50 parts by weight based on 100 parts by weight of said calcium compound and the amount of said calcium compound is 0.6 to 1 mol based on 1 mol of chlorine contained in said combustible wastes.

7. A method of incinerating chlorine-containing combustible waste according to claim 1, wherein the amount of said particles is 11 to 50 parts by weight based on 100 parts by weight of said calcium compound and the amount of said calcium compound is 0.8 to 1 mol based on 1 mol of chlorine contained in said combustible wastes.

8. A chlorine-scavenger comprising:
100 parts by weight of a calcium compound, and particles selected from the group consisting of
(a) iron oxide particles selected form the group consisting of hematite particles, magnetite particles, maghemite particles and mixed particles thereof,
(b) ferric oxide hydroxide particles selected from the group consisting of goethite particles, akaganeite particles, lepidocrocite particles and mixed particles thereof, and
(c) mixtures of (a) and (b),
the amount of the iron oxide particles, ferric oxide hydroxide particles or their mixture of being 2 to 100 parts by weight based on 100 parts by weight of the calcium compound,
wherein the average particle size of the iron oxide particles is 0.01 to 1.0 μm in the case of granular particles, the average major axial diameter of the iron oxide particles is 0.1 to 0.5 μm in the case of spindle-shaped particles, the average major axial diameter of the iron oxide particles is 0.1 to 0.5 μm in the case of acicular particles, and the average major axial diameter of the ferric oxide hydroxide particles is 0.08 to 0.5 μm.

9. A chlorine-scavenger according to claim 8, wherein said particles are (b) ferric oxide hydroxide particles.

10. A chlorine-scavenger according to claim 8, wherein said calcium compound is selected from the group consisting of calcium oxide, calcium hydroxide, calcium carbonate and mixtures thereof.

11. A chlorine-scavenger according to claim 8, wherein said chlorine-scavenger is granulated form or pelletized form composed of said calcium compound, particles selected from the group consisting of iron oxide particles, ferric oxide hydroxide particles and mixed particles thereof, and an organic binder.

12. A chlorine-scavenger according to claim 11, wherein said organic binder is selected from the group consisting of a thermoplastic resin, a thermosetting resin, a natural high polymer, fats, oils, wax, tar and pitch.

13. A plastic formed product comprising:
0.01 to 10.0 wt % of the chlorine-scavenger defined in claim 8, and
90 to 99.9 wt % of a thermoplastic resin or a thermosetting resin.

14. A shopping bag or a waste bag comprising:
0.1 to 10.0 wt % of the chlorine-scavenger defined in claim 8 and
90 to 99.9 wt % of a thermoplastic resin.

15. A shopping bag or a waste bag according to claim 14 wherein said thermoplastic resin is one selected from the group consisting of high-density polyethylene and linear low-density polyethylene.

16. A method of using a calcium compound and particles for incinerating chlorine-containing combustible waste at a temperature of not lower than 700° C., wherein said particles are selected from the group consisting of
(a) iron oxide particles selected from the group consisting of hematite particles, magnetite particles, maghemite particles and mixed particles thereof,
(b) ferric oxide hydroxide particles selected from the group consisting of goethite particles, akaganeite particles, lepidocrocite particles and mixed particles thereof, and
(c) mixtures of (a) and (b);
the amount of said particles is 2 to 100 parts by weight based on 100 parts by weight of said calcium compound;
the amount of said calcium compound is 0.25 to 1.0 mol based on 1 mol of chlorine contained in said combustible waste;
the average particle size of the iron oxide particles is 0.01 to 1.0 μm in the case of granular particles;
the average major axial diameter of the iron oxide particles is 0.1 to 0.5 μm in the case of spindle-shaped particles;
the average major axial diameter of the iron oxide particles is 0.1 to 0.5 μm in the case of acicular particles; and
the average major axial diameter of the ferric oxide hydroxide particles is 0.08 to 0.5 μm.

17. A method according to claim 16, wherein said particles are (b) ferric oxide hydroxide particles.

18. A method according to claim 16, wherein said calcium compound is selected from the group consisting of calcium oxide, calcium hydroxide, calcium carbonate and mixtures thereof.

19. A method according to claim 16, wherein said combustible waste is incinerated at a temperature of not lower than 850° C.

20. A method according to claim 16, wherein the amount of said particles is 3 to 50 parts by weight based on 100 parts by weight of said calcium compound and the amount of said calcium compound is 0.4 to 1 mol based on 1 mol of chlorine contained in said combustible waste.

21. A method according to claim 16, wherein the amount of said particles is 10 to 50 parts by weight based on 100 parts by weight of said calcium compound and the amount of said calcium compound is 0.6 to 1 mol based on 1 mol of chlorine contained in said combustible waste.

22. A method according to claim 16, wherein the amount of said particles is 11 to 50 parts by weight based on 100 parts by weight of said calcium compound and the amount of said calcium compound is 0.8 to 1 mol based on 1 mol of chlorine contained in said combustible waste.

* * * * *